United States Patent
Hong et al.

(10) Patent No.: US 10,317,933 B2
(45) Date of Patent: Jun. 11, 2019

(54) ELECTRONIC DEVICE

(71) Applicant: Lenovo (Beijing) Co., Ltd., Beijing (CN)

(72) Inventors: Chuanbao Hong, Beijing (CN);
Xiaopeng Wang, Beijing (CN);
Wanmin Ling, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/723,953

(22) Filed: Oct. 3, 2017

(65) Prior Publication Data
US 2018/0173273 A1 Jun. 21, 2018

(30) Foreign Application Priority Data

Dec. 20, 2016 (CN) .......................... 2016 1 1187611

(51) Int. Cl.
*G06F 1/16* (2006.01)
*H04M 1/02* (2006.01)
*C03C 15/00* (2006.01)

(52) U.S. Cl.
CPC ................ *G06F 1/16* (2013.01); *C03C 15/00* (2013.01); *G06F 1/1637* (2013.01); *G06F 1/1656* (2013.01); *H04M 1/0202* (2013.01); *H04M 1/026* (2013.01); *H04M 1/0266* (2013.01)

(58) Field of Classification Search
CPC ......... G06F 1/16; H04M 1/0202; C03C 15/00
USPC ..................................................... 361/679.55
See application file for complete search history.

(56) References Cited

U.S. PATENT DOCUMENTS

| | | | | |
|---|---|---|---|---|
| 2014/0111684 A1* | 4/2014 | Corbin | ................... | H01Q 1/243 348/374 |
| 2016/0224822 A1* | 8/2016 | Hasegawa | ............. | C03C 21/002 |
| 2016/0357294 A1* | 12/2016 | Ozeki | ..................... | C03C 15/00 |
| 2018/0126704 A1* | 5/2018 | Zhang | ..................... | C03C 15/00 |

FOREIGN PATENT DOCUMENTS

| CN | 104965613 A | 10/2015 |
|---|---|---|
| CN | 105068605 A | 11/2015 |
| CN | 205644577 U | 10/2016 |
| CN | 106201093 A | 12/2016 |

* cited by examiner

*Primary Examiner* — Rockshana D Chowdhury
(74) *Attorney, Agent, or Firm* — Anova Law Group, PLLC (57) ABSTRACT

An electronic device includes a display screen, a transparent cover plate, and a sensing unit. The transparent cover plate has a first region and a second region. The first region corresponds to the display screen. The second region includes a non-through hole provided at an inner surface of the transparent cover plate. The sensing unit is arranged in the non-through hole.

11 Claims, 9 Drawing Sheets

ELECTRONIC DEVICE

CROSS-REFERENCE TO RELATED APPLICATION

This application claims priority to Chinese Patent Application No. 201611187611.7, filed on Dec. 20, 2016, the entire contents of which are incorporated herein by reference.

TECHNICAL FIELD

The present disclosure generally relates to the field of electronic devices and, more particularly, to an electronic device and a fabrication method thereof.

BACKGROUND

Fingerprint recognition has broad applications in a variety of electronic devices. For example, in a smart phone, a fingerprint recognition unit can generally be integrated with a Home key. The fingerprint recognition unit and the Home key can be embedded in a through hole provided in a glass cover plate over the surface of the smart phone. A top surface of the through hole can be covered with a sapphire glass or another appropriate protective material.

However, in a conventional electronic device, making a through hole in a glass cover plate causes degradation in an integrity of the glass cover plate. Accordingly, an overall strength, appearance integrity, and waterproof performance of the electronic device may be reduced.

SUMMARY

In one aspect, the present disclosure provides an electronic device. The electronic device includes a display screen, a transparent cover plate, and a sensing unit. The transparent cover plate has a first region and a second region. The first region corresponds to the display screen. The second region includes a non-through hole provided at an inner surface of the transparent cover plate. The sensing unit is arranged in the non-through hole.

Another aspect of the present disclosure provides a method. The method includes providing a transparent cover plate including a first region and a second region, processing at a processing position located in the second region and located at an inner surface of the transparent cover plate such that a non-through hole is formed, assembling a sensing unit in the non-through hole to form a component, and fixedly coupling the component to a display screen.

BRIEF DESCRIPTION OF THE FIGURES

The following drawings are merely examples for illustrative purposes according to various disclosed embodiments and are not intended to limit the scope of the present disclosure.

DETAILED DESCRIPTION

Embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

Figure 1:
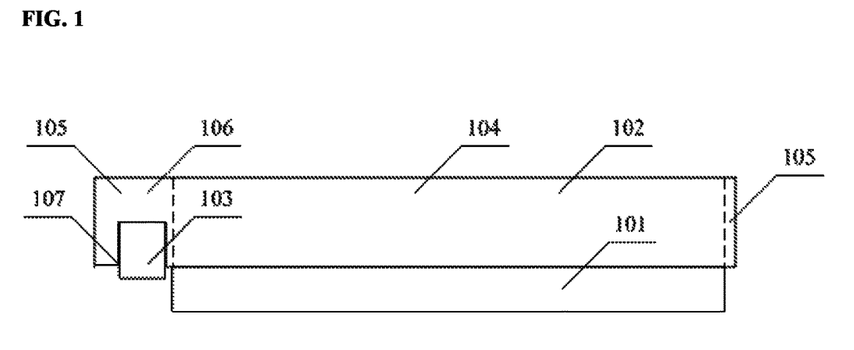
FIG. 1 illustrates a schematic view of an example of electronic device according to various disclosed embodiments of the present disclosure.

FIG. 1 illustrates a schematic view of an example of electronic device according to various disclosed embodiments of the present disclosure. The electronic device can be a desktop computer, a notebook computer, a tablet computer, a cell phone, a smart television, a smart watch, a wearable device, or another appropriate electronic device.

As shown in FIG. 1, the electronic device includes a display screen 101, a transparent cover plate 102, and a sensing unit 103.

FIG. 1 illustrates a schematic side view of the electronic device. An outer surface of the transparent cover plate 102, i.e., an upper surface of the transparent cover plate 102 in FIG. 1, is a surface that a user can contact. The display screen 101 is arranged and coupled to an inner-surface side of the transparent cover plate 102, i.e., a lower surface of the transparent cover plate 102 in FIG. 1.

The transparent cover plate 102 includes a first region 104 and a second region 105. The display screen 101 is arranged corresponding to the first region 104. An inner surface of a first position 106 in the second region 105 is provided with a non-through hole 107 to form an accommodating space.

The sensing unit 103 is arranged in the accommodating space formed by the non-through hole 107.

Figure 2:
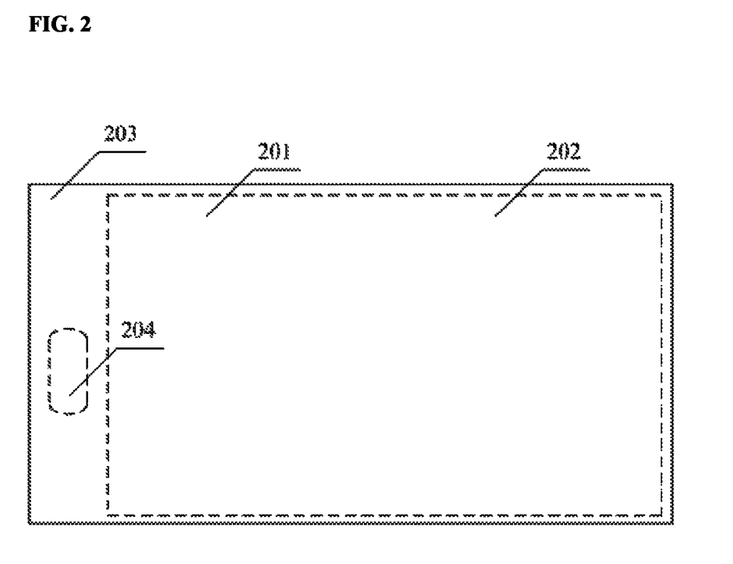
FIG. 2 illustrates a schematic view of an example of transparent cover plate of an example of electronic device according to various disclosed embodiments of the present disclosure.

FIG. 2 illustrates a schematic view of an example of transparent cover plate 201 of an example of electronic device according to various disclosed embodiments of the present disclosure. FIG. 2 illustrates a schematic top view of the transparent cover plate 201. As shown in FIG. 2, the transparent cover plate 201 includes a first region 202 and a second region 203. The first region 202 corresponds to a display screen in the electronic device, and the second region 203 is a region other than the region corresponding to the display screen. An inner surface of a first position 204 of the second regions 203 is provided with a non-through hole. The non-through hole couples a surface layer and an inner layer of the transparent cover plate 201, and does not penetrate through the whole transparent cover plate 201. The non-through hole is indicated by a dashed line in FIG. 2.

The first position 204 of the second region 203 can be a region corresponding to a Home key. The Home key can be integrated with a fingerprint recognition unit. In response to pressing, touching, or another appropriate operation by a user's finger on the Home key region, a sensing unit provided in an accommodating space of the non-through hole can sense and collect information about the user's pressing, touching, and/or the user's fingerprint information.

In some embodiments, the transparent cover plate may be processed under a reinforcing treatment and a de-impurity treatment to improve a strength and transparency of the transparent cover plate.

In some embodiments, the first region of the transparent cover plate may correspond to the position of the display screen, and cover and protect the display screen. Accordingly, the second region of the transparent cover plate may correspond to the region over the surface of the electronic device other than the region of the display screen, and may include the Home key region and the regions corresponding to the upper, lower, left and right frames other than the display screen region.

In some embodiments, the first region and the second region may be divided in another manner. For example, the second region may be a region corresponding to the Home key. Accordingly, the first region may include a region corresponding to the display screen, and further include regions corresponding to the upper, lower, left and right frames other than the display screen region and excluding the Home key region. That is, at least one portion of the first region of the transparent cover plate may correspond to the display screen.

In some embodiments, as being viewed from the outer surface of the transparent cover plate, a cross-sectional shape of the non-through hole may appear as a combination of a rectangle and semicircles. The cross-sectional shape is not limited to the combination of the rectangle and semicircles. The cross-sectional shape may be selected according to various application scenarios. The cross-sectional shape may be a square, a rectangle, a circle, an ellipse, or a combination of several shapes, or another shape that is compatible with the shape of the sensing unit, or another appropriate shape.

Thus, the present disclosure provides an electronic device. The electronic device may include a display screen, a sensing unit, and a transparent cover plate including a first region and a second region. The display screen may be arranged corresponding to the first region. A non-through hole may be provided at an inner surface of a first position in the second region to form an accommodating space, and the sensing unit may be arranged in the accommodating space of the non-through hole. In the electronic device of the present disclosure, a non-through hole may be provided in the inner surface of the transparent cover plate. The non-through hole may couple a surface layer to an inner layer of the transparent cover plate without penetrating through the whole transparent cover plate. The non-through hole may have a structure with a certain depth to form a vacant space, i.e., the accommodating space, within which the sensing unit can be accommodated. Accordingly, the sensing unit can be installed without a need to have a hole penetrating through the transparent cover plate. As a result, a completeness of the transparent cover plate and an appearance integrity of the transparent cover plate may be ensured, and an overall strength of the transparent cover plate may be improved. Because the transparent cover plate of the electronic device is not penetrated through by a hole, the surface of the transparent cover plate surface may be complete as a whole piece, thereby improving a waterproof performance of the electronic device.

Figure 3:
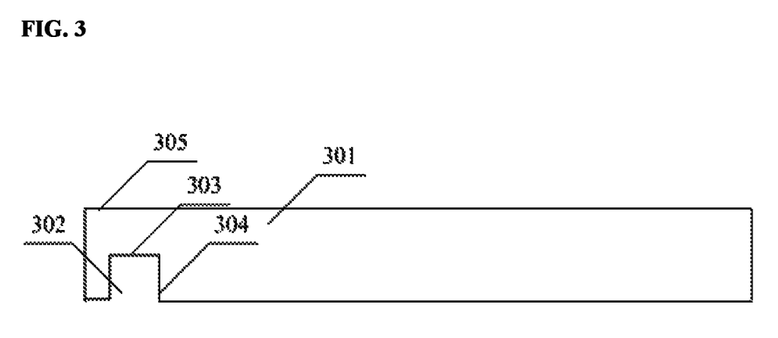
FIG. 3 illustrates a schematic view of an example of transparent cover plate of an example of electronic device according to various disclosed embodiments of the present disclosure.

FIG. 3 illustrates a schematic view of an example of transparent cover plate 301 of an example of electronic device according to various disclosed embodiments of the present disclosure. The electronic device may include a display screen, a transparent cover plate, and a sensing unit. Structures and functions of the display screen, the transparent cover plate, and the sensing unit are the same as or similar to structures and functions of the corresponding parts of the electronic device shown in FIG. 1, and thus detailed description thereof is omitted.

As shown in FIG. 3, the transparent cover plate 301 is provided with a non-through hole 302. The non-through hole 302 includes a bottom surface 303 and a side wall 304. A distance between the bottom surface 303 of the non-through hole 302 and an outer surface 305 of the transparent cover plate is smaller than a preset value.

In some embodiments, to ensure that the recognition function of the sensing unit is not degraded, a distance between the sensing unit and the outer surface of the transparent cover plate may be set to be smaller than or equal to approximately 0.3 mm. In some embodiments, a distance between the bottom surface of the non-through hole and the outer surface of the transparent cover plate may be generally configured to be within approximately 0.26 mm.

In some embodiments, the distance between the bottom surface of the non-through hole and the outer surface of the transparent cover plate can be referred to as a thickness of the non-through hole region. The thickness of the non-through hole region may be a difference between a thickness of the transparent cover plate and a depth of the non-through hole. The depth of the non-through hole may refer to a vertical distance between the bottom surface of the non-through hole and the inner surface of the transparent cover plate.

In some embodiments, the bottom surface of the non-through hole may needs to be flat enough to ensure an accuracy of the sensing information acquisition. Thus, a flatness of the bottom surface may need to be smaller than a preset value. In some embodiments, the preset value may be smaller than or equal to approximately 0.05 mm.

In some embodiments, the flatness of a surface may refer to a difference between a highest point and a lowest point difference in a unit area of the surface, and a tolerance value may be determined according to a precision level. The smaller the flatness is, the more flat is the surface.

In some embodiments, the non-through hole may be obtained by an etching process and a computer numerical control (CNC) machining, which will be described below.

A material of the transparent cover plate corresponding to a preset depth at the first position is processed by the etching process such that a hardness of the material is changed from a first hardness to a second hardness less than the first hardness. The material of the second hardness is then removed from the transparent cover plate by the CNC machining to form the non-through hole until a distance between the bottom surface of the non-through hole and the outer surface of the transparent cover plate is smaller than a preset value.

In some embodiments, the side wall of the non-through hole may be perpendicular to the inner surface of the transparent cover plate. As a result, from a user's point of view, over the outer surface of the transparent cover plate, a tactile feel over the region corresponding to the non-through hole may be the same as or similar to that over other positions. Thus, the appearance integrity of the transparent cover plate may be relatively good.

In the embodiments described above, the side wall of the non-through hole is perpendicular to the inner surface of the transparent cover plate. In some other embodiments, the side wall of the non-through hole may be not perpendicular to the inner surface of the transparent cover plate. In these embodiments, the side wall of the non-through hole may form a chamfer with the inner surface of the transparent cover plate. In some embodiments, the chamfer may have a C angle, i.e., approximately 45°. Whether or not the side wall of the non-through hole is perpendicular to the inner surface of the transparent cover plate is not restricted in the present disclosure, and can be selected according to various application scenarios.

Figure 4:
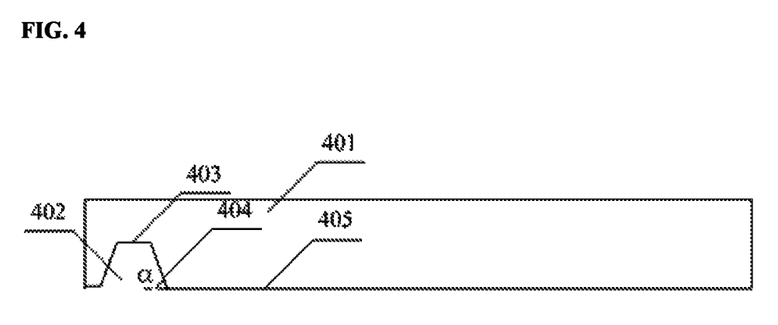
FIG. 4 illustrates a schematic view of another example of transparent cover plate of an example of electronic device according to various disclosed embodiments of the present disclosure.

FIG. 4 illustrates a schematic view of another example of transparent cover plate 401 of an example of electronic device according to various disclosed embodiments of the present disclosure. As shown in FIG. 4, the transparent cover plate 401 is provided with a non-through hole 402. The non-through hole 402 includes a bottom surface 403 and a side wall 404. As shown in FIG. 4, an angle α of a chamfer formed by the side wall 404 and an inner surface of the transparent cover plate 401 is approximately 45°.

The angle of the chamfer is not limited to a C angle, which can be selected according to various application scenarios.

In some embodiments, the side wall of the non-through hole and the inner surface of the transparent cover plate may be chamfered in a circular arc type, and the side wall of the non-through hole and the bottom surface of the non-through hole may be chamfered in a circular arc type.

Figure 5:
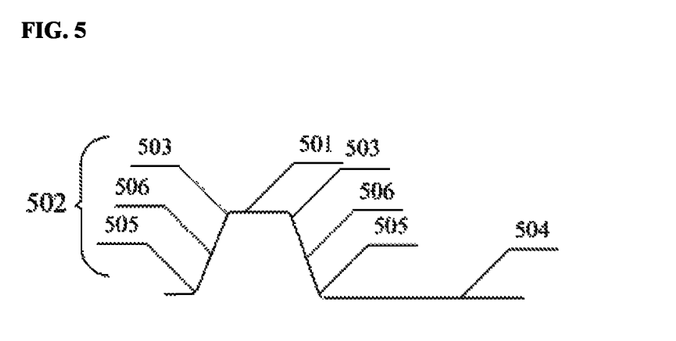
FIG. 5 illustrates a schematic view of an example of non-through hole in an example of electronic device according to various disclosed embodiments of the present disclosure.

FIG. 5 illustrates a schematic view of an example of non-through hole in an example of electronic device according to various disclosed embodiments of the present disclosure. As shown in FIG. 5, the non-through hole includes a bottom surface 501 and a side wall 502. The side wall 502 includes a first arc 503 connected with the bottom surface 501 for transition and a second arc 505 connected with an inner surface 504 of the transparent cover plate for transition. The two arc transition regions for chamfers in the side wall are coupled by an oblique plane 506. That is, the side wall 502 includes the first arc 503, the oblique plane 506, and the second arc 505.

In some embodiments, a length of the oblique plane of the side wall may be greater than or equal to approximately 0.4 mm, and a value R (e.g., radius) of the chamfer arc transitions may be greater than approximately 0.15 mm.

Figure 6:
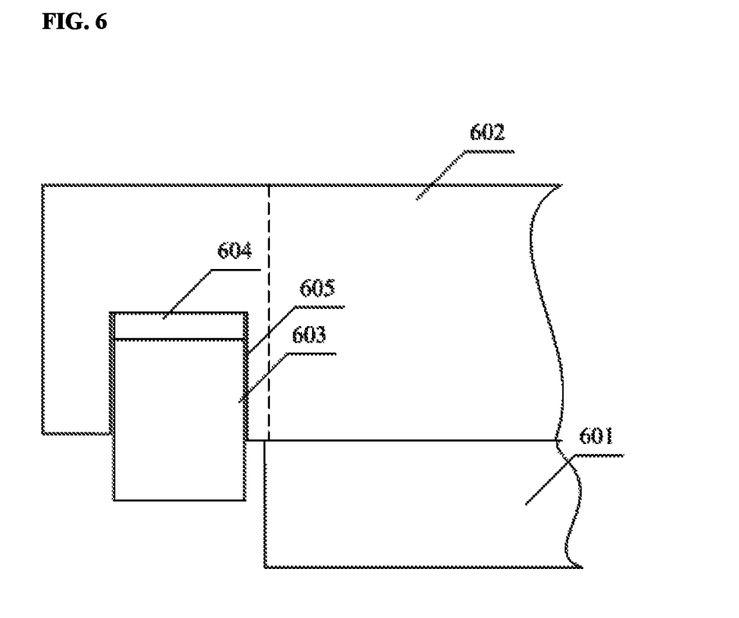
FIG. 6 illustrates a schematic view of another example of electronic device according to various disclosed embodiments of the present disclosure.

FIG. 6 illustrates a schematic view of another example of electronic device according to various disclosed embodiments of the present disclosure. As shown in FIG. 6, the electronic device includes a display screen 601, a transparent cover plate 602, and a sensing unit 603.

Structures and functions of the display screen 601, the transparent cover plate 602, and the sensing unit 603 are the same as or similar to structures and functions of the corresponding parts of the electronic device shown in FIG. 1, and thus detailed description thereof is omitted.

The sensing unit 603 is supported in an accommodating space 605 of a non-through hole of the transparent cover plater 602 by an adhesive 604.

As shown in FIG. 6, a layer of adhesive 604 exists between a bottom surface of the non-through hole and the sensing unit 603.

In some embodiments, to ensure that a recognition function of the sensing unit is not degraded, a distance between the sensing unit and the outer surface of the transparent cover plate may need to be smaller than or equal to approximately 0.3 mm.

Correspondingly, a thickness of the adhesive may generally be configured to be approximately 0.02-0.03 mm.

In some embodiments, ingredients of the adhesive may be selected according to materials of the transparent cover plate and the sensing unit. For example, the adhesive used for the transparent cover plate formed by a glass material may be different from the adhesive used for the transparent cover plate formed by a plastic material. The ingredients of the adhesive are not restricted in the present disclosure, and may be selected according to various application scenarios.

In some embodiments, the adhesive may be arranged over the bottom surface of the non-through hole. Accordingly, the sensing unit may be inserted into the non-through hole by aligning the sensing unit with an installation region of the non-through hole, such that the sensing unit is arranged and supported in the accommodating space by the adhesive.

Further, the sensing unit is bonded and fixed to the transparent cover plate through the adhesive, and baked and cured to obtain a first component. The cover plate and the sensing unit of the first component are integrated into one piece after the foregoing treatment.

The present disclosure provides an electronic device, in which a sensing unit may be supported in an accommodating space by an adhesive. The sensor unit may be arranged and supported in a non-through hole of a cover plate by the adhesive, such that no relative movement between the sensor unit and the cover plate may exist. Accordingly, a fingerprint recognition accuracy of the electronic device may be improved.

Figure 7:
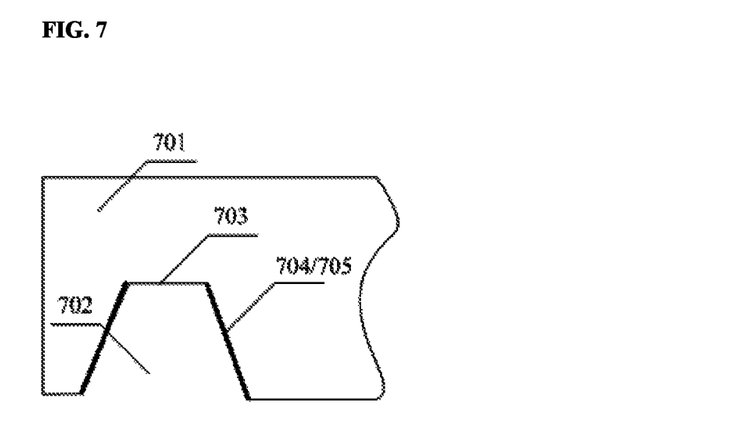
FIG. 7 illustrates a schematic view of another example of transparent cover plate of an example of electronic device according to various disclosed embodiments of the present disclosure.

FIG. 7 illustrates a schematic view of another example of transparent cover plate 701 of an example of electronic device according to various disclosed embodiments of the present disclosure. The electronic device includes a display screen, the transparent cover plate 701, and a sensing unit.

Structures and functions of the display screen, the transparent cover plate, and the sensor unit are the same as or similar to structures and functions of the corresponding parts of the electronic device shown in FIG. 1, and thus detailed description thereof is omitted.

As shown in FIG. 7, the transparent cover plate 701 is provided with a non-through hole 702. The non-through hole 702 includes a bottom surface 703 and a side wall 704. An electroplated layer 705 is arranged over the side wall 704 of the non-through hole 702, such that the side wall can produce a stereoscopic effect due to a refraction of light.

In some embodiments, an angle between the side wall of the non-through hole and the inner surface of the transparent cover plate is smaller than approximately 90°. Thus, the side wall appears as a slope loop with respect to the outer surface of the transparent cover plate. Because the electroplating process is applied to the slope loop, the electroplated slope loop can exhibit a 3-dimensional (3D) effect due to a refraction of light when viewed from an outer-surface side of the transparent cover plate.

In some embodiments, the electroplated layer can be used to alert a user of a location of the sensing unit, such that the user can locate the corresponding operation region for the sensing unit based on the electroplated layer.

Figure 8:
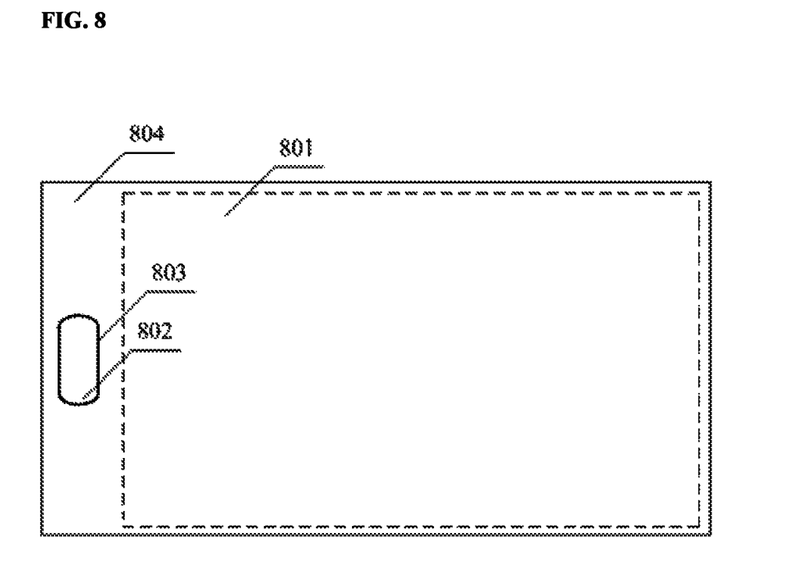
FIG. 8 illustrates a schematic view of an example of transparent cover plate of an example of electronic device according to various disclosed embodiments of the present disclosure.

FIG. 8 illustrates a schematic view of an example of transparent cover plate 801 of an example of electronic device according to various disclosed embodiments of the present disclosure. As shown in FIG. 8, the transparent cover plate 801 is provided with a non-through hole 802. An electroplated layer 803 is arranged over a side wall of the non-through hole 802. Due to a refraction of light, a region of the side wall can produce a stereoscopic effect. A paint of a first color is printed over an inner surface 804 of the transparent cover plate 801. The first color of the paint fits a body color of the electronic device.

Because the side wall of the non-through hole is provided with the electroplated layer, the user sees a side wall having a stereoscopic effect when viewing from an outer-surface side of the transparent cover plate. The edge of the non-through hole, i.e., the side wall, is indicated by a thick solid line in FIG. 8.

In some embodiments, the color of the printed paint over the inner surface 804 of the transparent cover plate 801 may be selected according to the body color of the electronic device.

In some embodiments, in order to improve the appearance integrity of the transparent cover plate, when the paint is printed, regions of the transparent cover plate other than the non-through hole may need to be printed, and the bottom surface of the non-through hole may also need to be printed.

In some embodiments, because the bottom surface of the non-through hole may have a relatively small area, a spray method may be used. In addition, in order to improve a finish of the sprayed surface, a gloss oil may be added to the sprayed surface.

The electronic device of the present disclosure is described with reference to embodiments of the present disclosure. The electronic device of the present disclosure can be realized by a plurality of methods. The present disclosure provides a method for fabricating the electronic device. Descriptions about the method will be made with reference to embodiments of the present disclosure.

Figure 9:
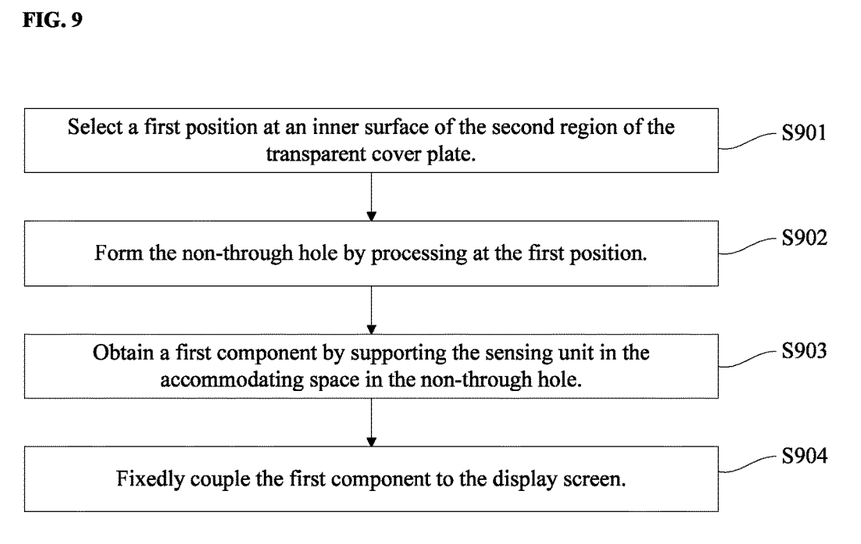
FIG. 9 illustrates a flow chart of an example of fabrication method for an example of electronic device according to various disclosed embodiments the present disclosure.

FIG. 9 illustrates a flow chart of an example of fabrication method for an electronic device according to various disclosed embodiments of the present disclosure. The electronic device can be a desktop computer, a notebook computer, a tablet computer, a cell phone, a smart television, a smart watch, a wearable device, or another appropriate electronic device. The electronic device may include a display screen, a transparent cover plate, and a sensing unit. The transparent cover plate may include a first region and a second region. The display screen may be arranged in correspondence with the first region.

The fabrication method will now be described.

At S901, a first position is selected at an inner surface of the second region of the transparent cover plate.

The first position of the second region may be a region corresponding to a Home key and be used for forming a non-through hole as described below. The Home key can be integrated with the fingerprint recognition unit. In response to pressing, touching, or another appropriate operation by a user's finger over the Home key region, a sensing unit provided in an accommodating space of the non-through hole can sense and collect information about the user's pressing, touching, and/or the user's fingerprint information.

At S902, the non-through hole is formed by processing at the first position.

A distance between a bottom surface of the non-through hole and an outer surface of the transparent cover plate is smaller than a preset value.

In some embodiments, a transparent material corresponding to the first position may be processed by an etching process and a CNC machining, such that the non-through hole may be formed at the first position.

The non-through hole may couple a surface layer of the transparent cover plate to an inner layer of the transparent cover plate without penetrating through the whole transparent cover plate, and may have a structure with a certain depth to form a vacant space, i.e., the accommodating space.

In some embodiments, to ensure that a recognition function of the sensing unit is not degraded, a distance between the sensing unit and the outer surface of the transparent cover plate may need to be smaller than or equal to approximately 0.3 mm. Accordingly, a distance between the bottom surface of the non-through hole and the outer surface of the transparent cover plate may be generally configured to be within approximately 0.26 mm.

In some embodiments, the distance between the bottom surface of the non-through hole and the outer surface of the transparent cover plate can be referred to as a thickness of the non-through hole region. The thickness of the non-through hole region may be a difference between a thickness of the transparent cover plate and a depth of the non-through hole. The depth of the non-through hole may refer to a vertical distance between the bottom surface of the non-through hole and the inner surface of the transparent cover plate.

At S903, a first component is obtained by assembling the sensing unit in the accommodating space in the non-through hole.

The sensing unit is placed in the accommodating space of the non-through hole, and is fixedly coupled to the bottom of the non-through hole, such that the sensing unit is fixedly arranged in the accommodating space in the non-through hole. The sensing unit and the transparent cover plate form the first component.

At S904, the first component is fixedly coupled to the display screen.

The display screen is close to the inner surface of the transparent cover plate and is arranged corresponding to the first region of the transparent cover plate.

For a relative positional relationship of the sensing unit, the display screen and the transparent cover plate, reference can be made to the structure of the electronic device shown in FIG. 1.

In some embodiments, the fixed coupling between the first component and the display screen may be performed by a screw coupling, a solder coupling, an adhesive coupling, or any other appropriate coupling. The manner of performing the fixed coupling between the first component and the display screen is not restricted in the present disclosure, and may be selected according to various application scenarios.

The present disclosure provides a fabrication method for an electronic device. By the fabrication method, a non-through hole may be provided at an inner surface of a transparent cover plate. The non-through hole may couple a surface layer of the transparent cover plate to an inner layer of the transparent cover plate without penetrating through the whole transparent cover plate. Further, the non-through hole may have a structure with a certain depth to form a vacant space, such that a sensing unit may be accommodated. Accordingly, the sensing unit can be installed without a need to provide a hole penetrating through the transparent cover plate, a completeness of the transparent cover plate and an appearance integrity of the transparent cover plate can be ensured, and an overall strength of the transparent cover plate can be improved. Because the transparent cover plate of the electronic device is not penetrated through by a hole, a surface of the transparent cover plate of the electronic device may be complete as a whole piece, thereby improving a waterproof performance of the electronic device. In addition, the sensor unit may be fixedly arranged in the non-through hole of the cover plate, such that no relative movement between the sensor unit and the cover plate may exist. Accordingly, a fingerprint recognition accuracy of the electronic device may be improved.

Figure 10:
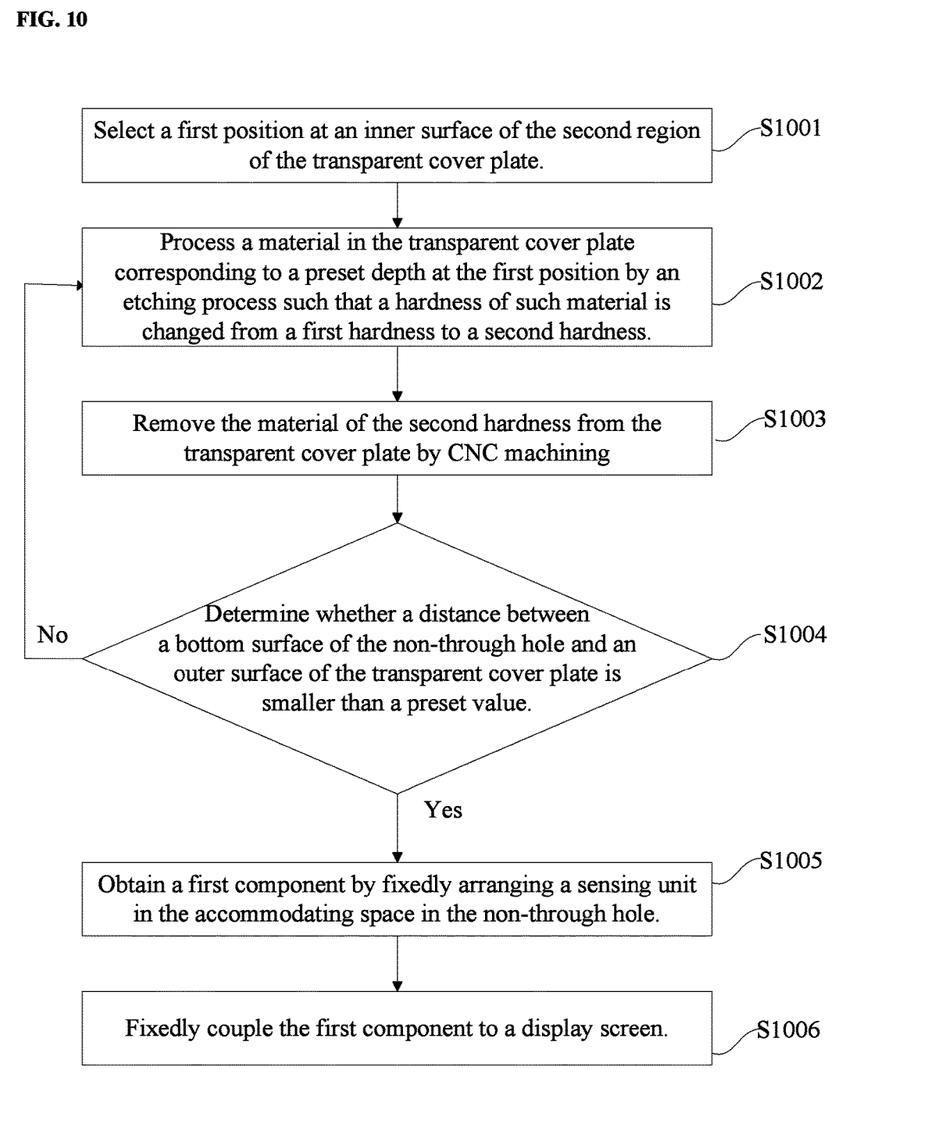
FIG. 10 illustrates a flow chart of another example of fabrication method for an example of electronic device according to various disclosed embodiments the present disclosure.

FIG. 10 illustrates a flow chart of another example of fabrication method for an example of electronic device according to various disclosed embodiments the present disclosure. With reference to FIG. 10, the fabrication method will now be described.

At S1001, a first position is selected at an inner surface of the second region of the transparent cover plate.

S1001 is the same as or similar to S901, and thus detailed description thereof is omitted.

At S1002, a material in the transparent cover plate corresponding to a preset depth at the first position is processed by an etching process such that a hardness of such material is changed from a first hardness to a second hardness.

The second hardness is less than the first hardness.

In some embodiments, over the first position of the transparent cover plate, an etching solution is applied, such that a hardness of the material at the first position is changed.

Due to a limited penetration capability of the etching solution, one etch can only change the hardness of the material of a preset depth at the first position in the transparent cover plate.

In some embodiments, the transparent cover plate may be a glass material, and the etching solution may be hydrofluoric acid, sodium fluoride, potassium fluoride, or anther appropriate etching solution. Ingredients of the etching solution are not restricted in the present disclosure, and can be selected according to various application scenarios.

At S1003: the material of the second hardness is removed from the transparent cover plate by CNC machining.

After the hardness of the material at the first position is changed, the material having the changed hardness is removed from the transparent cover plate by the CNC machining technique.

In some embodiments, during the use of CNC machining technique to remove the material having the changed hardness, a thickness of the removed material can be less than the preset depth corresponding to the etching process to ensure that the removal operation may not damage the remaining portion of the transparent cover plate, and to prevent the cover plate from breaking.

At S1004, whether a distance between a bottom surface of the non-through hole and an outer surface of the transparent cover plate is smaller than a preset value is determined. If the distance between the bottom surface of the non-through hole and the outer surface of the transparent cover plate is smaller than the preset value, S1005 is executed. Otherwise, S1002 is executed by returning back.

In some embodiments, a depth corresponding to one etching process may be smaller than a preset depth of the non-through hole. Thus, the preset depth of the non-through hole may be reached after the etching process and the CNC machining process are performed for a plurality of times.

The depth of the non-through hole may refer to a vertical distance between the bottom surface of the non-through hole and the inner surface of the transparent cover plate.

In some embodiments, after S1003 is performed and the material is removed, if the distance between the bottom surface of the non-through hole and the outer surface of the transparent cover plate is smaller than the preset value, the depth of the non-through hole is determined to reach the preset depth of the non-through hole and, accordingly, the etching process and the CNC machining process are stopped. Otherwise, S1002 and S1003 need to be executed again.

At S1005, a first component is obtained by fixedly arranging a sensing unit in the accommodating space in the non-through hole.

At S1006, the first component is fixedly coupled to a display screen.

S1005 and S1006 are same as or similar to S903 and S904, and thus detailed description thereof is omitted.

The present disclosure provides a fabrication method for an electronic device. In the fabrication method of the disclosure, obtaining of a non-through hole at a first position of a transparent cover plate may include processing a material in the transparent cover plate corresponding to a preset depth at the first position to change the hardness thereof from a first hardness to a second hardness by an etching process, and removing the material of the second hardness from the transparent cover plate by CNC machining until a distance between a bottom surface of a non-through hole and an outer surface of the transparent cover plate is smaller than a preset value. With the fabrication method, the non-through hole can be obtained by using the etching process and the CNC machining for a plurality of times. The processing procedure is flexible.

Figure 11:
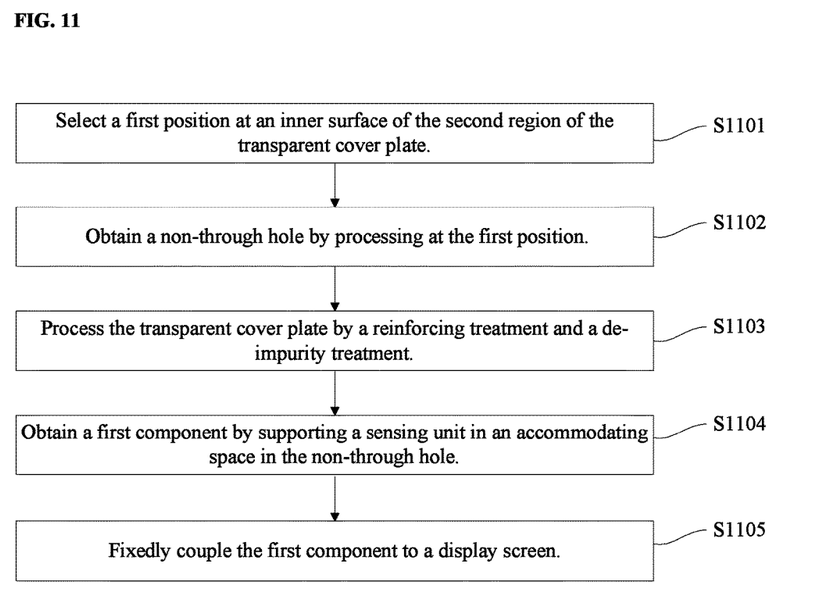
FIG. 11 illustrates a flow chart of another example of fabrication method for an example of electronic device according to various disclosed embodiments the present disclosure.

FIG. 11 illustrates a flow chart of another example of fabrication method for an example of electronic device according to various disclosed embodiments the present disclosure. The fabrication method will now be described.

At S1101, a first position is selected at an inner surface of the second region of the transparent cover plate.

At S1102, a non-through hole is obtained by processing at the first position.

S1101 and S1102 are the same as or similar to S901 and S902, and thus detailed description thereof is omitted.

At S1103, the transparent cover plate is processed by a reinforcing treatment and a de-impurity treatment.

In some embodiments, in order to improve a strength and transparency of the transparent cover plate, the transparent cover plate can be processed by a reinforcing treatment and a de-impurity treatment.

For example, the transparent cover plate may be placed in a preset solution, in which chemical compositions of the preset solution may be exchanged with surface chemical compositions of the transparent cover plate. As a result, the surface chemical compositions of the transparent cover plate may be modified, and the strength of the transparent cover plate may be improved.

In some embodiments, atomic sizes of the chemical compositions participating in the exchange may be different. A relatively long time for the reinforcing treatment may result in an excessive reinforcement, causing a surface flatness of the transparent cover plate to be affected. A relatively short time for the reinforcing treatment may result in an insufficient reinforcement, causing a strength of the transparent cover plate to be insufficient. Thus, the time for the reinforcing treatment and the compositions of the solution for the reinforcing treatment may need to be controlled.

In some embodiments, by controlling the compositions of the solution, the chemical compositions in the solution may replace impurities in the transparent cover plate, and the de-impurity for the transparent cover plate may be realized.

The compositions of the preset solution for the reinforcing treatment and the de-impurity treatment are not restricted in the present disclosure, and can be selected according to various application scenarios.

At S1104, a first component is obtained by assembling a sensing unit in an accommodating space in the non-through hole.

At S1105, the first component is fixedly coupled to a display screen.

S1104 and S1105 are the same as or similar to S901 and S902, and detailed description thereof is omitted.

The present disclosure provides a fabrication method for an electronic device. The fabrication method may further include processing a transparent cover plate by a reinforcing treatment and a de-impurity treatment. With the fabrication method, a strength of the transparent cover plate can be increased, and a transparency of the transparent cover plate can be improved by removing impurities in the transparent cover plate.

Figure 12:
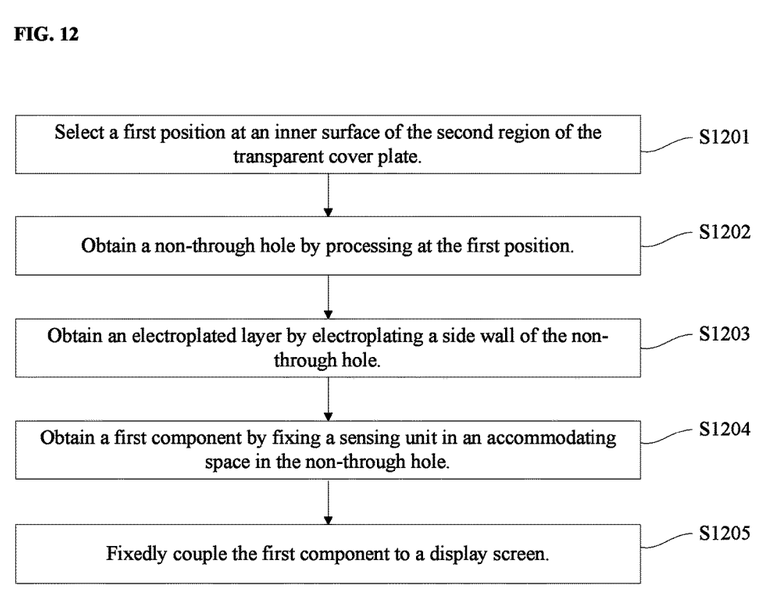
FIG. 12 illustrates a flow chart of another example of fabrication method for an example of electronic device according to various disclosed embodiments the present disclosure.

FIG. 12 illustrates a flow chart of another example of fabrication method for an example of electronic device according to various disclosed embodiments the present disclosure. The fabrication method will now be described.

At S1201, a first position is selected at an inner surface of the second region of the transparent cover plate.

At S1202, a non-through hole is obtained by processing at the first position.

S1201 and S1202 are the same as or similar to S901 and S902, and thus detailed description thereof is omitted.

At S1203, an electroplated layer is obtained by electroplating a side wall of the non-through hole.

In some embodiments, electroplating is performed over the side wall of the non-through hole to obtain the electroplated layer, such that the side wall can generate a stereoscopic effect due to a refraction of light.

In some embodiments, an angle between a side wall of the non-through hole and an outer surface of the transparent cover plate is smaller than approximately 90°. Thus, the side wall appears as a slope loop with respect to the outer surface of the transparent cover plate. Because the electroplating process is applied to a slope loop, the electroplated slope loop can generate 3-dimensional (3D) effect due to a refraction of light when viewed from an outer-surface side of the transparent cover.

In some embodiments, the electroplated layer can be used to alert a user of a location of the sensing unit, such that the user can locate the corresponding operation region of the sensing unit based on the electroplated layer.

In some embodiments, the inner surface of the transparent cover plate may be processed by a screen printing technique to allow color matching between the transparent cover plate and a body of the electronic device. Accordingly, the transparent cover plate may be printed.

In some embodiments, a color of a printed paint over the inner surface of the transparent cover plate may be selected according to a body color of the electronic device.

In some embodiments, in order to improve an appearance integrity of the transparent cover plate, when the paint is printed, regions of the transparent cover plate other than the non-through hole may need to be printed, and a bottom surface of the non-through hole may need to be printed as well.

In some embodiments, because the bottom surface of the non-through hole may have a relatively small area, a spray method may be used. In addition, in order to improve a finish of the sprayed surface, a gloss oil may be added to the sprayed surface.

At S1204, a first component is obtained by assembling a sensing unit in an accommodating space in the non-through hole.

At S1205, the first component is fixedly coupled to a display screen.

S1204 and S1205 are the same as or similar to S901 and S902, and thus detailed description thereof is omitted.

The present disclosure provides a fabrication method for an electronic device. The fabrication method may further include obtaining an electroplated layer by electroplating a side wall of a non-through hole, such that the side wall may generate a stereoscopic effect due to a refraction of light. The electroplated layer may be obtained by electroplating the side wall of the non-through hole, and a visual experience over the electronic device may be improved.

Figure 13:
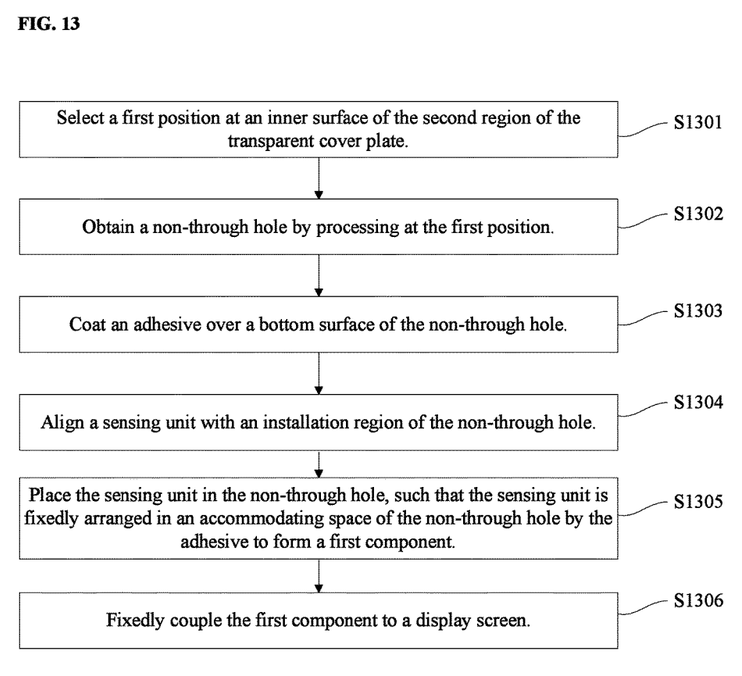
FIG. 13 illustrates a flow chart of another example of fabrication method for an example of electronic device according to various disclosed embodiments the present disclosure.

FIG. 13 illustrates a flow chart of another example of fabrication method for an example of electronic device according to various disclosed embodiments the present disclosure. The fabrication method will now be described.

At S1301, a first position is selected at an inner surface of the second region of the transparent cover plate.

At S1302, a non-through hole is obtained by processing at the first position.

S1301 and S1302 are the same as or similar to S901 and S902, and thus detailed description thereof is omitted.

At S1303, an adhesive is coated over a bottom surface of the non-through hole.

The adhesive may be coated over the bottom surface of the non-through hole, by coating the adhesive over an entire area of the bottom surface, or by coating the adhesive over certain positions according to a shape of the sensing unit.

In some embodiments, the adhesive may be coated over a side of a sensing unit, which is a side to be coupled to the bottom surface of the non-through hole.

In some embodiments, before the adhesive is coated to the non-through hole, the transparent cover plate may be cleaned with a cleaning agent to ensure a cleanness of the transparent cover plate.

In some embodiment, during a transportation of the sensing unit, a good packaging may be needed to prevent dirt and foreign matter from being introduced in the transportation.

At S1304, a sensing unit is aligned with an installation region of the non-through hole.

In some embodiments, the sensing unit and the installation area of the non-through hole may be aligned by using a charge-coupled device (CCD) camera photo-capturing technique, to ensure a minimum tolerance of fitting during alignment.

At S1305, the sensing unit is placed in the non-through hole, such that the sensing unit is fixedly arranged in an accommodating space of the non-through hole by the adhesive to form a first component.

In some embodiments, based on an alignment, the sensing unit is placed in the non-through hole to ensure that the sensor unit and the transparent cover plate are fixedly coupled based on the adhesive to form the first component.

In some embodiments, S1305 may further include baking the first component to cure the adhesive.

In some embodiments, baking time and curing temperature may be configured according to the compositions of the adhesive.

At S1306, the first component is fixedly coupled to a display screen.

S1306 is the same as or similar to S904, and thus detailed description thereof is omitted.

The present disclosure provides a fabrication method for an electronic device. In the fabrication method of the present disclosure, the obtaining of a first component by fixedly arranging a sensing unit in an accommodating space in a non-through hole may include coating an adhesive to the bottom surface of the non-through hole in a transparent cover plate; aligning the sensing unit with an installation region of the non-through hole; placing the sensing unit in the non-through hole, such that the sensing unit is fixedly arranged in the accommodating space of the non-through hole by the adhesive to form the first component. By the fabrication method of the disclosure, the sensing unit can be fixedly coupled to the bottom surface of the non-through hole by the adhesive, and the sensing unit can be assembled in the non-through hole of the transparent cover plate. Thus, no relative movement between the sensing unit and the transparent cover plate may exist. Accordingly, a fingerprint recognition accuracy of the electronic device may be improved.

The present disclosure provides an electronic device. The electronic device may include a display screen, a sensing unit, and a transparent cover plate. The transparent cover plate may include a first region and a second region. The display screen may be arranged corresponding to the first region. An inner surface of the first position in the second region may be provided with a non-through hole to form an accommodating space. The sensing unit may be arranged in the accommodating space of the non-through hole. The non-through hole may couple a surface layer and an inner layer of the transparent cover plate without penetrating through the whole transparent cover plate. The non-through hole may have a structure with a certain depth to form the accommodating space, such that the sensing unit can be accommodated. Accordingly, the sensing unit can be installed without a need to have a hole penetrating through the transparent cover plate, a completeness of the transparent cover plate and an appearance integrity of the transparent cover plate may be ensured, and an overall strength of the transparent cover plate may be improved. Because the transparent cover plate of the electronic device is not penetrated through by a hole, a surface of the transparent cover plate surface may be complete as a whole piece, thereby improving a waterproof performance of the electronic device.

Embodiments of the present disclosure are described in a progressive manner, each of which is focused on the differences from other embodiments, and the same or similar parts between the various embodiments may be referred to each other. Because devices provided by the embodiments correspond to methods provided in the embodiments, the descriptions about the devices are relatively brief. References can be made to descriptions of method parts for the relevant parts of devices.

The foregoing description of the embodiments of the disclosure has been presented for purposes of illustration and description. It is not intended to be exhaustive or to limit the disclosure to the precise form or to embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto and their equivalents in which all terms are meant in their broadest reasonable sense unless otherwise indicated. Therefore, the term "the disclosure," "the present disclosure," or the like does not necessarily limit the claim scope to a specific embodiment, and the reference to embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. An electronic device, comprising:
a display screen;
a transparent cover plate including:
a first region corresponding to the display screen; and
a second region including a non-through hole provided at an inner surface of the transparent cover plate,
the non-through hole including an inner non-through hole surface and an oblique side wall arranged between the inner non-through hole surface and the inner surface of the transparent cover plate;
a sensing unit arranged in the non-through hole; and
an electroplated layer over the oblique side wall of the non-through hole without over the inner non-through hole surface of the non-through hole,
the electroplated layer being configured to refract light to produce a stereoscopic effect at the oblique side wall.

2. The electronic device according to claim 1, wherein the sensing unit is supported in an accommodating space by an adhesive.

3. The electronic device according to claim 2, wherein the adhesive is provided at the inner non-through hole surface of the non-through hole.

4. The electronic device according to claim 1, wherein:
a distance between the inner non-through hole surface of the non-through hole and an outer surface of the transparent cover plate is less than a preset value, the outer surface of the transparent cover plate being opposite to the inner surface of the transparent cover plate.

5. The electronic device according to claim 1, wherein the oblique side wall forms a chamfer with the inner surface of the transparent cover plate.

6. The electronic device according to claim 5, where the chamfer has a C angle.

7. A method, comprising:
providing a transparent cover plate including a first region and a second region; processing at a processing position of the transparent cover plate to form a non-through hole,
wherein the processing position is located in the second region and at an inner surface of the transparent cover plate,
the non-through hole including an inner non-through hole surface and an oblique side wall arranged between the inner non-through hole surface and the inner surface of the transparent cover plate;
electroplating the oblique side wall of the non-through hole to form an electroplated layer, the electroplated layer being over the oblique side wall of the non-through hole but not over the inner non-through hole surface of the non-through hole, and the electroplated layer being configured to refract light to produce a stereoscopic effect at the oblique side wall;
assembling a sensing unit in the non-through hole to form a component; and
fixedly coupling the component to a display screen.

8. The method according to claim 7, wherein processing at the processing position includes:
processing a material in the transparent cover plate corresponding to a preset depth at the processing position by an etching process to change a hardness of the material from a first hardness to a second hardness less than the first hardness; and
removing the material of the second hardness from the transparent cover plate by computer numerical control machining.

9. The method according to claim 8, wherein processing at the processing position further includes:
repeating the etching process and the computer numerical control machining until a distance between the inner non-through hole surface of the non-through hole and an outer surface of the transparent cover plate is smaller than a preset value, the outer surface of the transparent cover plate being opposite to the inner surface of the transparent cover plate.

10. The method according to claim 7, further comprising:
processing the transparent cover plate by a reinforcing treatment and a de-impurity treatment, after processing at the processing position and before assembling the sensing unit.

11. The method according to claim 7, wherein assembling the sensing unit in the non-through hole includes:
coating an adhesive over the inner non-through hole surface of the non-through hole; aligning the sensing unit with an installation region of the non-through hole; and placing the sensing unit in the non-through hole to fixedly arrange the sensing unit in the non-through hole by the adhesive to form the component.

* * * * *